June 24, 1969          F. H. WOOD          3,452,349
RESERVE BEARING RESTRAINT AND TRANSFER ALARM
Filed March 30, 1966          Sheet 1 of 2
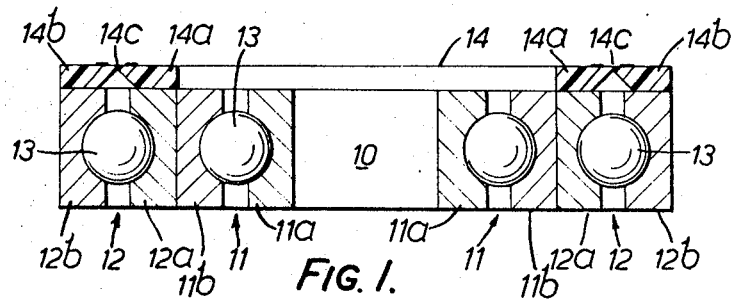
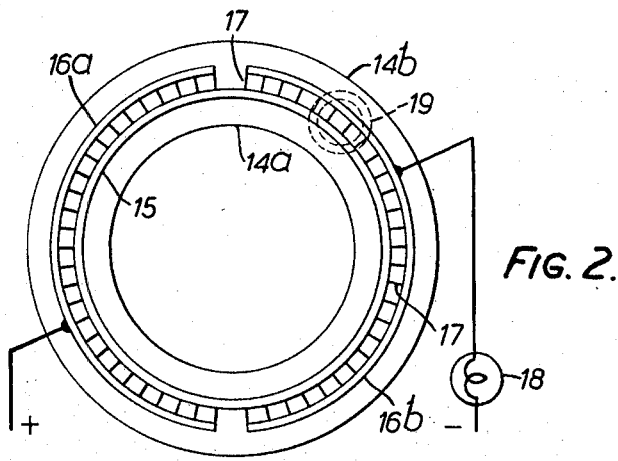
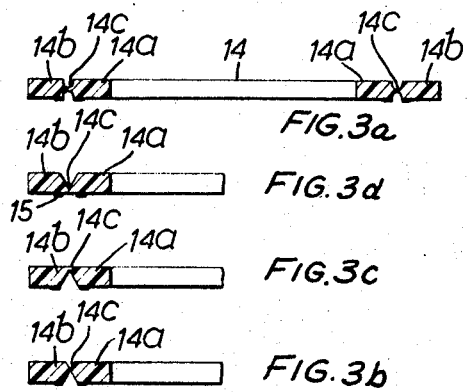
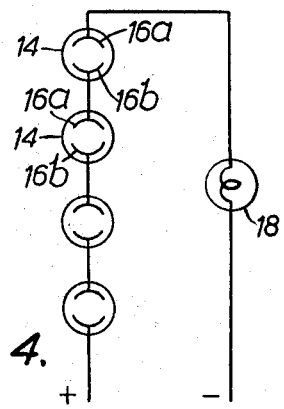
INVENTOR
Francis Harold Wood
BY
ATTORNEY

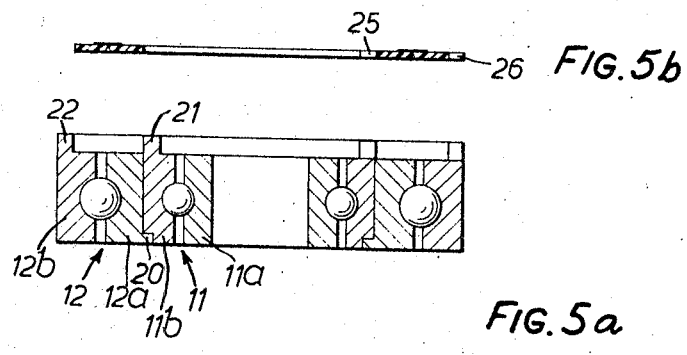
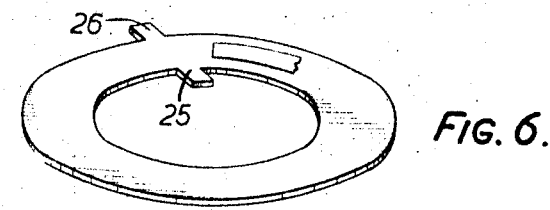
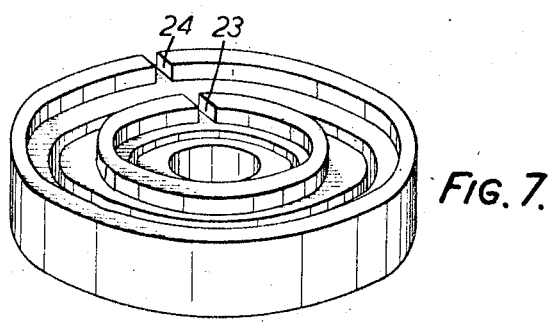

United States Patent Office 3,452,349
Patented June 24, 1969

3,452,349
RESERVE BEARING RESTRAINT AND TRANSFER ALARM
Francis H. Wood, London, England, assignor to Elliott Brothers (London) Limited, London, England, a British company
Filed Mar. 30, 1966, Ser. No. 538,658
Int. Cl. G08b 21/00
U.S. Cl. 340—269                          17 Claims

ABSTRACT OF THE DISCLOSURE

A dual bearing comprises inner and outer bearings for journaling a shaft. A bridging member is provided which normally prevents the outer bearing from being operative. The bridging member has a zone of mechanical weakness which is sheared when the inner bearing ceases to function and thus allows the outer bearing to become operative. Electrical means detects the shearing of the bridging member and thus the failure of the inner bearing.

---

The invention relates to bearings and to apparatus, methods and systems for monitoring bearings.

It is common practice in control systems, particularly for aircraft, to obtain a high degree of reliability by using redundancy in one or more of many forms. There are, however, many parts of a complete system where redundancy cannot be applied. Such a case arises where two or more systems must control a single output shaft and this shaft is often made so substantial that the chance of a failure is negligible. The bearings supporting such shafts are sometimes duplicated i.e. dual bearings, one arranged radially within the other.

When a mechanical unit is designed and installed within a system it is usually impossible to make an inspection of the dual bearing at desirable frequent intervals and therefore the time on risk is that laid down usually as the overhaul life of the unit.

Should one of the dual bearings fail at an early stage in the overhaul life of the unit the second bearing is on risk for the major proportion of the overhaul life.

According to one aspect of the invention there is provided a bearing arrangement comprising at least two sets of members capable of rotating relatively to one another and of journalling a rotatable element, and a restraining means secured to the members of one of the sets or to the members of each said set except one, the or each said restraining means acting to prevent relative rotation of the corresponding members of the set until the friction torque developed by the relatively rotating members exceeds a predetermined amount, whereupon said restraining means releases said members of the initially restrained set to permit said members to journal said rotatable element.

Further according to the present invention there is provided a bearing arrangement comprising two sets of bearing members, one set being arranged within the other, the innermost member being arranged to be secured on a shaft or other rotatable element, and a restraining member secured to both members of one set, said restraining member having a zone of weakness arranged to fracture when the friction torque between the members of the other set exceeds a predetermined amount, whereby the members of the initially restrained set are brought into operation to journal said shaft.

Still further according to the present invention there is provided apparatus capable of controlling the operation of a dual bearing, comprising means arranged to restrain the operation of one of the bearings whilst the other bearing is functioning satisfactorily, said means being so arranged that if said other bearing ceases to function satisfactorily said one bearing is allowed to become operative and being arranged to provide a signal to indicate failure of said other bearing.

Yet further according to the present invention there is provided a system for monitoring the operation of a dual bearing comprising an indicator device connected for energisation by a circuit including a number of electrical conductors arranged to be ruptured when one of the bearings fails.

Yet further according to the present invention there is provided a method of monitoring a dual bearing comprising restraining the operation of one of the bearings whilst the other bearing is functioning satisfactorily, causing one bearing to become operative if said other bearing ceases to function satisfactorily and producing a signal when said one bearing becomes operative so as to indicate failure of said other bearing.

Certain embodiments of dual bearings in accordance with the invention will now be described, by way of example, with reference to the accompanying diagrammatic drawing, in which:

FIGURE 1 shows a sectional view through the preferred embodiment of a dual bearing and an associated bridging member;

FIGURE 2 shows a plan view of the bridging member;

FIGURES 3(a), (b), (c) and (d) shows sectional views through other bridging members;

FIGURE 4 shows a diagram of a circuit for monitoring the operation of a plurality of dual bearings.

FIGURE 5 is an exploded section of a modified dual bearing and bridging member;

FIGURE 6 is a perspective view of the bridging member of FIGURE 5; and

FIGURE 7 is a perspective view of the dual bearing of FIGURE 5.

Referring now to FIGURE 1, there is shown a dual bearing having a central bore 10 into which a shaft to be journalled thereby can be inserted, an inner ball bearing generally indicated at 11 and an outer ball bearing generally indicated at 12. Each of the ball bearings comprises an inner race 11a and 12a respectively, an outer race 11b and 12b respectively, and balls 13.

A bridging member in the form of a ring 14 has an inner portion 14a secured to the inner race 12a and an outer portion 14b secured to the outer race 12b. The portions 14a, 14b of the bridging member can be secured to the respective races by teeth, dowel pins, dutch pins, keys or any other suitable device. One such device is illustrated in FIGURES 5 and 7 and will be described in detail hereinafter. The portions 14a and 14b of the bridging member 14 are connected by a grooved portion 14c. It will be appreciated that the portions 14a, 14b and 14c are in practice integrally formed.

In use, a shaft to be journalled (not shown) is inserted in the bore 10 and is secured to the inner race 11a of the bearing 11. The bridging member 14 prevents relative rotation between the inner and outer races 12a and 12b and so the shaft is effectively journalled only by the inner bearing 11. The grooved portion 14c of the bridging member 14 is of such a thickness that when the bearing 11 generates a friction torque above a predetermined safe value the grooved portion 14c shears so enabling the bearing 12 to journal the shaft.

Referring now to FIGURE 2, the bridging member 14 is fabricated of an insulating material, for example a synthetic-resin such as "perspex" or polytetrafluorethylene. Positioned on one face of the inner portion 14a of the bridging member 14 is an annular conductor 15 and positioned on one face of the outer portion 14b are two separate substantially semi-annular conductors 16a and 16b. The conductors 16a and 16b are separately electrically connected to the conductor 15 by a plurality of conductors 17 each of which spans the grooved portion 14c of the bridging member 14. All of the conductors 15, 16 and 17 can conveniently be formed by printed circuit techniques.

It will now be seen that, in operation, when the bridging member shears at the grooved portion 14c, the connector conductors 17 are broken and hence the connections between conductors 16a and 16b, via the conductors 17 and the conductor 15, are broken. In FIGURE 2, the conductors 15, 16 and 17 are included in a series circuit for energising an indicator lamp or other device 18 and hence it will be seen that when the bridging member 14 shears the indicator lamp 18 is extinguished. Thus an indication if given when the bearing 11 has become faulty and the bearing 12 is taken into use.

In order to determine more closely the value of friction torque that the bearing 11 is allowed to develop before the bridging member 14 shears, apertures 19 (only one shown in broken lines) can be provided spaced around the bridging member between the inner and outer portions 14a and 14b respectively. In this case it is necessary to extend the conductors 15 and 16 around these holes 19 so that the whole of the conductor surface is carrying current for the energisation of the indicator lamp 18.

Referring now to FIGURES 3(a), (b), (c) and (d) there is shown a number of different cross-sectional patterns that can be utilised to provide the grooved portion 14c of the bridging member 14. Again, the bridging member 14 may be conveniently fabricated utilising a synthetic-resin by a pressing or moulding technique.

In FIGURE 3(a) two grooves of U-section are formed and the conductors 15, 16a, 16b are formed on one of the faces of the bridging member. In FIGURE 3(b) two V-section grooves are provided, one being deeper than the other. The conductors 15, 16a, 16b are formed along opposite edges of the deeper groove whilst conductors 17 follow the contour of the deeper groove. Only one groove is formed in the bridging member of FIGURE 3(c), the conductors 15, 16a, 16b being formed on the opposite face to the groove. The bridging member of FIGURE 3(d) is the same as that of FIGURE 3(c) except that it is arranged so that the conductors 15, 16a, 16b fit into the annular space between the races 12a, 12b.

As is shown in FIGURE 4, a number of dual bearings can conveniently be monitored utilising a single indicator lamp or other device 18 by connecting the electrical circuits of the bridging members 14 in series in the circuit for energisation of the indicator lamp 18.

Although in the embodiment and modifications thereof shown the outer bearing 12 is initially restrained and the inner bearing 11 initially journals the shaft, it is of course possible to have a converse arrangement. The arrangement shown is, however, preferred because the outer portion 12b of the bearing 12 is always the stationary portion so that the bridging member 14 is stationary and therefore there is no difficulty in providing connections to the arcuate conductors 16a and 16b.

In the modification illustrated in FIGURES 5 to 7, two ball bearing assemblies 11, 12 are again provided, but the inner race 12a has a radially-inwardly extending integral annular flange 20 which engages in a complementary annular recess in the outer race 11b of the inner bearing 11. The outer races 11b, 12b each have an integral axially-extending flange 21, 22 which form an almost complete annulus. The respective gaps 23, 24 are engaged by tongues 25, 26 of the bridging member 14, which otherwise has a form similar to any of those hereinbefore described. The flanges 21, 22 and the tongues 25, 26 together serve to render the bridging member rigid with the inner and outer races of the outer bearing 12.

We claim:
1. A bearing arrangement comprising two sets of bearing members, one set being arranged within the other, the innermost bearing member being arranged to be secured on a rotatable element, and a restraining member secured to both members of one set, said restraining member having a zone of weakness arranged to fracture when the friction torque between the members of the other set exceeds a predetermined amount, whereby the members of the initially restrained set are brought into operation to journal said rotatable element.

2. An arrangement according to claim 1, wherein each set of members comprises
   an inner race,
   an outer race, and
   balls rollable between the races.

3. An arrangement according to claim 1, wherein said restraining member comprises
   a washer-like ring with an annular groove in one face thereof, said groove constituting the zone of weakness.

4. An arrangement according to claim 3, wherein the groove is of V-section.

5. An arrangement according to claim 3, wherein the groove is of U-section.

6. An arrangement according to claim 1, wherein said restraining member comprises
   a washer-like ring with an annular groove in each face thereof, said grooves lying at the same radius and constituting the zone of weakness.

7. An arrangement according to claim 6, wherein each said groove is of U-section.

8. An arrangement according to claim 1, wherein said restraining member comprises
   a washer-like ring having a plurality of spaced apertures.

9. An arrangement according to claim 1, wherein the restraining member is of a synthetic-resin.

10. An arrangement according to claim 1, further comprising
    means for indicating when the initially-restrained bearing members come into effective use.

11. An arrangement according to claim 10, wherein said restraining member is made of an electrically insulating material and the indicating means include an electrical circuit which is interrupted when the restraining member becomes ineffective.

12. An arrangement according to claim 11, wherein said circuit includes
    an annular conductor rigid with a part of said restraining member secured to one member of the restrained set,
    a pair of substantially semi-annular conductors rigid with a part of said restraining member secured to the other member of the restrained set, and
    a plurality of conductors extending between said annular conductor and said semi-annular conductors.

13. An arrangement according to claim 10, comprising an indicator lamp.

14. Apparatus capable of controlling the operation of a dual bearing, comprising
    means arranged to restrain the operation of one of the bearings including a bridging member, said bridging member being so formed that it shears when the other bearing develops a friction torque above a predetermined value whereby said one bearing is allowed to become operative, and part of an electrical circuit carried by the bridging member which part is broken when the bridging member shears, and
    means responsive to the breaking of said part to generate a signal to indicate failure of said other bearing.

15. Apparatus according to claim 14, wherein the bridging member is made of electrically-insulating material and said part of an electrical circuit carried by the bridging member comprises conductor members arranged to be broken when the bridging member shears.

16. Apparatus according to claim 15, wherein the conductor members are formed by a printed circuit technique and the bridging member is in the form of a ring,
   one of the conductor members formed on a portion of the ring secured on the inner race of one bearing being circular, and
   a pair of said conductor members being semi-annular and both said substantially semi-annular conductor members being formed on another portion of said ring secured on the outer race of said one bearing and separately electrically-connected to the annular conductor, whereby the two semi-annular conductors can be connected to complete an electrical circuit of an indicator device, this circuit being broken when the member shears.

17. A system for monitoring the operation of a dual bearing comprising
   an indicator device,
   a number of electrical conductors arranged to be ruptured when one of the bearings fails, and
   a circuit connecting the indicator device to said conductors.

References Cited
UNITED STATES PATENTS

| | | | |
|---|---|---|---|
| 1,506,856 | 9/1924 | McCluskey | 308—183 |
| 3,129,904 | 4/1964 | Hanson | 308—35 X |
| 3,183,043 | 5/1965 | Creeger et al. | 308—1 |

D. L. TRAFTON, *Primary Examiner.*

J. W. CALDWELL, *Assistant Examiner.*

U.S. Cl. X.R.

200—61.08, 61.39; 308—1, 183; 340—271